(12) United States Patent
Fricke (10) Patent No.: US 11,059,512 B2
(45) Date of Patent: Jul. 13, 2021

(54) ADJUSTABLE STEERING COLUMN FOR A MOTOR VEHICLE, COMPRISING AN ENERGY ABSORPTION DEVICE

(71) Applicants: thyssenkrupp Presta AG, Eschen (LI); thyssenkrupp AG, Essen (DE)

(72) Inventor: Sascha Fricke, Hard (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 44 days.

(21) Appl. No.: 16/634,742

(22) PCT Filed: Aug. 8, 2018

(86) PCT No.: PCT/EP2018/071506
§ 371 (c)(1),
(2) Date: Jan. 28, 2020

(87) PCT Pub. No.: WO2019/030283
PCT Pub. Date: Feb. 14, 2019

(65) Prior Publication Data
US 2020/0207402 A1   Jul. 2, 2020

(30) Foreign Application Priority Data
Aug. 10, 2017 (DE) ............ 10 2017 213 912.9

(51) Int. Cl.
*B62D 1/19* (2006.01)
*B62D 1/181* (2006.01)

(52) U.S. Cl.
CPC ............ *B62D 1/195* (2013.01); *B62D 1/181* (2013.01); *B62D 1/192* (2013.01)

(58) Field of Classification Search
None
See application file for complete search history.

(56) References Cited

U.S. PATENT DOCUMENTS 10,946,889 B2 * 3/2021 Appleyard ............ B62D 1/185
2006/0033321 A1   2/2006 Manwaring
(Continued)

FOREIGN PATENT DOCUMENTS

WO   2017/125311 A   7/2017

OTHER PUBLICATIONS

English Translation of International Search Report issued in PCT/EP2018/071506, dated Nov. 29, 2018.

*Primary Examiner* — Faye M Fleming
(74) *Attorney, Agent, or Firm* — thyssenkrupp North America, LLC (57) ABSTRACT

An adjustable steering column may include an actuating unit, a carrying unit, a transmission device, an energy absorption apparatus, and a coupling device. The coupling device may be disconnected from the actuating unit and/or the transmission device in a crash event, which enables movement between the actuating unit and the transmission device. The coupling device includes a pin-shaped holding element with a head, which holding element is fixed in a counterholder. An element that is connected fixedly to the transmission device or the actuating unit may be arranged between the counterholder and the head. A second thickness of all the elements arranged between the counterholder and the head may be smaller, in the case of a movement of the actuating unit relative to the transmission device, than a first thickness of all the elements in the case where the actuating unit is fixed relative to the transmission device.

9 Claims, 4 Drawing Sheets

(56) References Cited

U.S. PATENT DOCUMENTS

| | | |
|---|---|---|
| 2007/0013182 A1 | 1/2007 | Bechtel |
| 2008/0229867 A1 | 9/2008 | Waibel |
| 2015/0232117 A1 | 8/2015 | Stinebring |
| 2016/0046318 A1 | 2/2016 | Stinebring |
| 2016/0121920 A1 | 5/2016 | Klepp |
| 2018/0244300 A1 | 8/2018 | Abou Alam |
| 2018/0265116 A1 | 9/2018 | Sulser |
| 2018/0290681 A1 | 10/2018 | Schädlich |
| 2018/0354546 A1 | 12/2018 | Kreutz |
| 2019/0232997 A1 | 8/2019 | Domig |
| 2020/0172148 A1* | 6/2020 | Schnitzer ............... B62D 1/192 |
| 2020/0207403 A1* | 7/2020 | Kirmsze ................ B62D 1/181 |

\* cited by examiner

ADJUSTABLE STEERING COLUMN FOR A MOTOR VEHICLE, COMPRISING AN ENERGY ABSORPTION DEVICE

CROSS REFERENCE TO RELATED APPLICATIONS

This application is a U.S. National Stage Entry of International Patent Application Serial Number PCT/EP2018/071506, filed Aug. 8, 2018, which claims priority to German Patent Application No. DE 10 2017 213 912.9, filed Aug. 10, 2017, the entire contents of both of which are incorporated herein by reference.

FIELD

The present disclosure generally relates to steering columns, including adjustable steering columns with energy absorption mechanisms.

BACKGROUND

A steering column having an energy absorption apparatus is known from US 2015/023 2117 A1. In the case of the known steering column, a coupling element which is arranged in terms of action between the longitudinal adjustment drive and the energy absorption apparatus is additionally fastened by means of rivets to the actuating unit. The rivets serve as a bypass for the adjusting forces, in order that, in normal operation, the adjusting forces are not transmitted via the energy absorption apparatus to the actuating unit, which might impair the function of the energy absorption apparatus. If, in the case of a vehicle crash, however, the actuating unit experiences a pronounced axial force in the direction of the vehicle front as a consequence of high impact energy, the riveted connections to the fixed coupling element shear off, with the result that an axial displacement occurs between the actuating unit and the coupling element, which axial displacement is braked with the aid of the energy absorption apparatus. The known steering column has the disadvantage that the breakaway force for shearing off the riveted connections cannot be set precisely to the requirements.

Thus a need exists for a steering column which, in the case of a vehicle crash, breaks away with a defined breakaway force.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, the present disclosure generally relates to an adjustable steering column for a motor vehicle. In some examples, such an adjustable steering column may include an actuating unit for mounting a steering shaft such that it can be rotated about a longitudinal axis, and a carrying unit, in which the actuating unit is mounted such that it can be displaced axially in the direction of the longitudinal axis of the steering shaft by means of a motorized longitudinal adjustment drive which is arranged on the carrying unit, and comprising, furthermore, a transmission device which is coupled on one side to the actuating unit and is coupled on the other side to the longitudinal adjustment drive, an energy absorption apparatus being provided which absorbs energy in the case of a displacement of the actuating unit with respect to the transmission device, a coupling device being provided which is connected to the actuating unit and which is connected to the transmission device, the connection of the coupling device to the actuating unit and/or the transmission device being canceled in the case of a crash, in the case of which a force which exceeds a predefined value acts on the steering shaft in the direction of the longitudinal axis, with the result that a movement is made possible between the actuating unit and the transmission device.

According to the invention, the coupling device comprises a pin-shaped holding element with a head, which holding element is fixed in a counterholder, at least one element which is connected fixedly to the transmission device or the actuating unit being arranged between the counterholder and the head, a second thickness of all the elements which are arranged between the counterholder and the head being smaller, in the case of a movement of the actuating unit with respect to the transmission device, than a first thickness of all the elements in the case where the actuating unit is fixed with respect to the transmission device in terms of their position relative to one another.

By way of the configuration of the first thickness and the second thickness of all the elements which are arranged between the head and the counterholder, a respective desired breakaway force can be set, the movement of the actuating unit with respect to the transmission device being made possible in the case of said breakaway force being exceeded. In this case, the case of a crash, the energy absorption apparatus can use up energy which is introduced into the displacement. In the case where the breakaway force is not exceeded, that is to say a force which lies below the respective desired limit for the breakaway force acts on the steering shaft, the movement of the actuating unit with respect to the transmission device is blocked. Said driving state represents the normal state during driving operation of the motor vehicle.

In the case of a crash, the connection of the coupling device to the actuating unit is preferably canceled. It is conceivable and possible, however, for the connection of the coupling device to the transmission device to be canceled in the case of a crash.

It can preferably be provided that the slot of the coupling device is arranged in a front end section of a coupling element, which front end section faces the vehicle front, and in the process is oriented axially parallel to the longitudinal axis and is configured so as to be open toward the front. In this embodiment, the pin-shaped holding element which is connected fixedly to the actuating unit and projects from the latter in the radial direction protrudes through the slot, which holding element comprises a widened head, and, in a rear region of the slot, which rear region faces away from the vehicle front, the coupling element comprises an edge region which is elevated in the radial direction and against which the head of the holding element lies with prestress. The first thickness is provided by way of the elevated edge region. In normal operation, the head of the holding element lies on the elevated edge region in a prestressed manner. In the case of a crash, a relative movement takes place between the holding element and the coupling element, with the result that the adhesive frictional force which acts between the head of the holding element and the elevated edge region is exceeded by the force which is introduced into the steering shaft. The head of the holding element then slides down from the elevated edge region, with the result that the prestress which acts is reduced when the head has slid down from the elevated edge region, since the second thickness of the elements between the head and the counterholder is smaller than the first thickness which is provided by way of the elevated edge region. In the normal state, the prestressing force of the elements which are clamped in between the head and the counterholder with the first thickness which is provided by way of the elevated edge region prevents the holding element from sliding axially in the slot. In the preferred form with the slot which is open at the front, sliding out of the open end of the slot is also prevented in the normal state as a result, in particular. In the case of a crash, however, the frictional force which counteracts the movement is reduced by way of the head of the holding element sliding down from the elevated edge region, and the relative movement is accordingly made possible. The frictional force which counteracts the movement is determined from the prestressing force which acts, which can also be called the normal force, and the coefficient of friction.

The solution according to the invention has the advantage that it is not the holding element itself which has to be broken away from its anchoring. Rather, the holding element with its head and the counterholder and the at least one element which is arranged between the head and the counterholder with the first thickness are under prestress, with the result that they are clamped firmly relative to one another and are fixed in a frictionally locking manner as long as, in the normal operation of the vehicle, only the relatively moderate adjustment forces are transmitted between the longitudinal adjustment drive of the carrying unit, the transmission device and the actuating unit. If, however, exceptionally high axial forces act on the coupling device in the case of a vehicle crash (called crash for short), a movement of the actuating unit takes place with respect to the transmission device and the prestress which acts between the head, the counterholder and the elements which are arranged between the head and the counterholder is reduced as a result, because the second thickness of the elements between the head and the counterholder is smaller than the first thickness of the elements between the head and the counterholder.

In one preferred embodiment, in which the first thickness is provided by way of an elevated edge region, the holding element slides off from the elevated edge region of the coupling element of the coupling device and moves in the direction of the longitudinal axis. After sliding off from the elevated edge region, the prestress and the frictionally locking connection between the holding element and the coupling element disappear or are at least reduced considerably, with the result that the holding element can move substantially freely through the slot and preferably out of its open end.

In one advantageous development, the second thickness is smaller than 0.9 times the first thickness. As a result, a considerable decrease in the prestressing force which acts between the head, the counterholder and the elements which are arranged between the head and the counterholder can be achieved.

The difference between the first thickness and the second thickness preferably has a value of at least 0.1 mm, particularly preferably 0.2 mm and very particularly preferably 0.3 mm.

In one specific embodiment of the invention, it can be provided that the second thickness of the elements between the head and the counterholder is 0 mm. This would be the case, for example, when the holding element has slid out of the slot, and therefore no element or no elements is/are arranged between the head and the counterholder, or an element between the head and the counterholder disintegrates into geometrically undefined individual parts in the case of the onset of the movement between the actuating unit and the transmission device, and therefore falls out of the region between the head and the counterholder.

One advantageous refinement of the invention provides that the pin-shaped holding element is configured as a rivet, a bolt or a screw. These are simple and inexpensive standard components which can be fastened to the actuating unit in a known way.

A bolt is understood to mean not only bolts with a circular-cylindrical base area, but rather the base area of the bolt can comprise any desired base area. A bolt with a circular-cylindrical base area is to be considered to be a preferred embodiment, however.

In one advantageous refinement, the actuating unit comprises a bore for fastening the rivet or a threaded bore for screwing in a screw, or a bore for pressing in the bolt.

In a refinement of the invention with a screw, a desired prestressing force is generated by way of an appropriate tightening torque of the screw. As a result, the tightening torque can advantageously be pre-selected in such a way that a previously defined breakaway force is required for overcoming the clamping connection, since the prestress which acts between the head, the counterholder and the element or elements which is/are arranged between the head and the counterholder is set by way of the tightening torque.

In one preferred refinement of the invention, in the case of a crash, the connection of the coupling device to the actuating unit is canceled, the energy absorption apparatus comprising at least one bending wire, the first end of which is connected to the actuating unit, and the second end of which is connected to the coupling device. If, in the case of a vehicle crash, the actuating unit is displaced axially with respect to the transmission device, the bending wire is deformed or, in other words, is bent, said bending wire absorbing part of the impact energy and braking the axial displacement of the actuating unit.

In a further advantageous refinement, the energy absorption apparatus comprises a second bending wire, the first end of which is connected to the actuating unit, and the second end of which is connected to the coupling device via a switching connection which can be released by means of a pyrotechnic switch. If the switching connection is switched on, the coupling device is connected to the two bending wires in the case of a vehicle crash, with the result that the two bending wires are bent and absorb impact energy. This leads to more pronounced braking of the actuating unit than in the first case, in which only one bending wire was activated. Should a central control unit of the vehicle determine, however, that less pronounced braking would be more advantageous on account of certain circumstances, it actuates the pyrotechnic switch, the connection between the second bending wire and the coupling device being interrupted. As a consequence, only the first bending wire is bent and the energy which is absorbed overall is halved. The consequence is less pronounced braking of the actuating unit.

It is possible as an alternative that, in the case of a crash, the connection of the coupling device to the transmission device is canceled, the energy absorption apparatus comprising at least one bending wire, the first end of which is connected to the transmission device, and the second end of which is connected to the coupling device. If, in the case of a vehicle crash, the actuating unit is displaced axially with respect to the coupling device which is fixed on the carrying unit, the bending wire is bent, said bending wire absorbing part of the impact energy and braking the axial displacement of the actuating unit. Two bending wires can also be provided accordingly, in an analogous manner to the abovementioned embodiment.

It is provided in a further advantageous embodiment of the invention that the longitudinal adjustment drive comprises a spindle drive with a spindle nut which can be displaced axially on a spindle, and that a transmission element which is connected to the spindle nut is configured, together with the coupling element, as a single-piece integral component. As a result, the number of components and the associated assembly costs are reduced.

Figure 1:
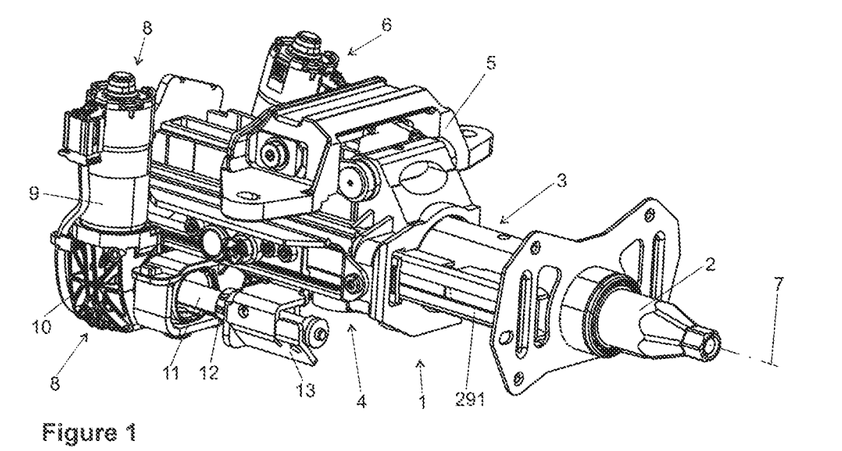
FIG. 1 is a perspective view of an example steering column in an installation-ready state.

An electrically adjustable steering column for a motor vehicle comprises a steering shaft 2 which is mounted in an actuating unit 3 such that it can be rotated about a longitudinal axis 7. The actuating unit 3 is for its part mounted in a carrying unit 4 such that it can be displaced along the longitudinal axis 7. In the example, the carrying unit 4 is in turn mounted pivotably in a holder 5 which is connected fixedly to the vehicle chassis (not shown), as a result of which a height adjustment of the steering shaft 2 is made possible. However, the invention can also be applied to steering columns which are not height-adjustable.

An electric height adjustment drive 6 which will not be described in further detail is provided for the height adjustment.

Figure 2:
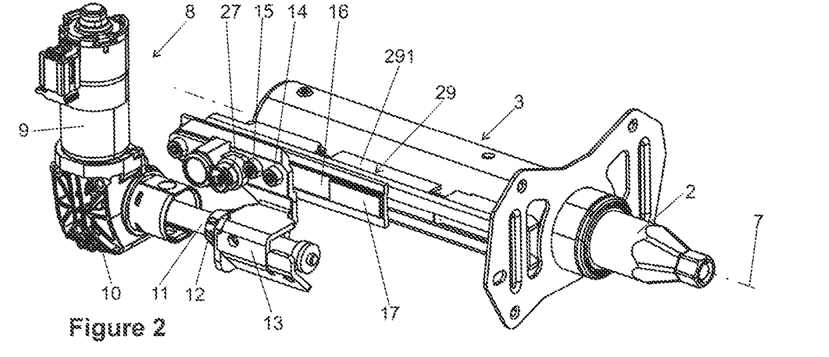
FIG. 2 is a perspective view of an example actuating unit of the steering column from FIG. 1 in conjunction with a longitudinal adjustment drive.
Figure 4:
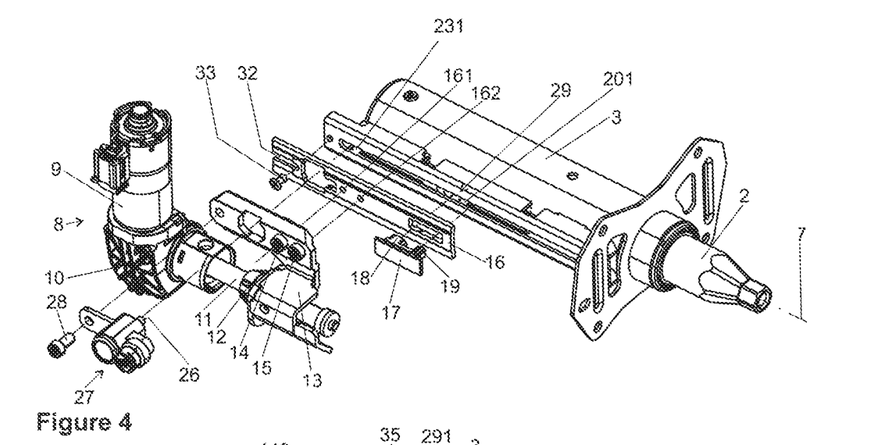
FIG. 4 is an exploded view of an actuating unit with a longitudinal adjustment drive.
Figure 5:
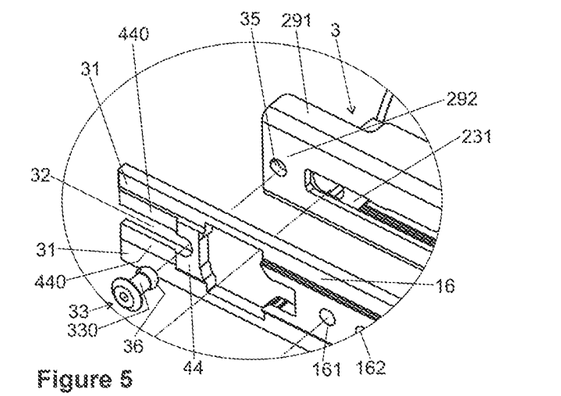
FIG. 5 is an enlarged detail view from FIG. 4.
Figure 6:
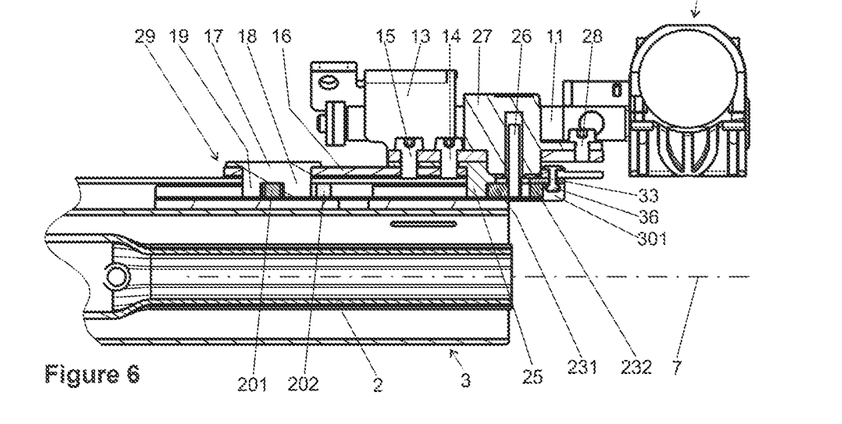
FIG. 6 is a top sectional view of an actuating unit having a longitudinal adjustment drive.

An electric longitudinal adjustment drive 8 is arranged on the carrying unit 4. The longitudinal adjustment drive 8 comprises an electric motor 9 and a gear mechanism 10 which is connected to a spindle 11. The electric motor 9 drives the spindle 11 via the gear mechanism 10. The spindle 11 is oriented along the longitudinal axis 7. A spindle nut 12 is seated on the spindle 11, which spindle nut 12 can be displaced to and fro along the longitudinal axis 7 by way of rotation of the spindle 11 by means of the electric motor 9. The spindle nut 12 is connected to the transmission device in the form of a transmission element 13 which is screwed by means of two fastening screws 14, 15 in bores 161 and 162, respectively, to a coupling element 16 of the coupling device, which coupling element 16 is oriented in the direction of the longitudinal axis 7. A plug-in part 17 is fastened to the coupling element 16, which plug-in part 17 comprises two fixing elements 18, 19 which are oriented in the radial direction transversely with respect to the longitudinal axis 7 and, between them, receive a round end 201 of a first bending wire 20, which round end 201 is bent over by approximately 270°.

Figure 3:
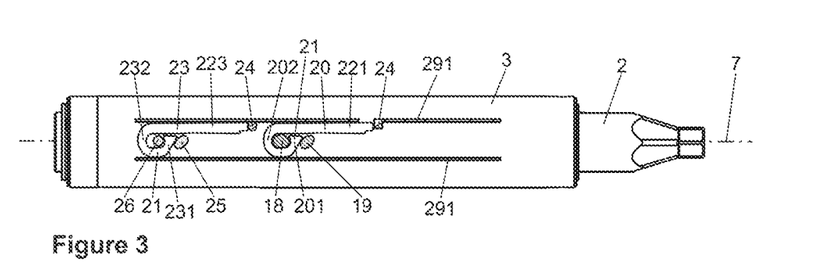
FIG. 3 is a side view of an actuating unit with an energy absorption apparatus.

As can be seen most clearly in FIG. 3, the actuating unit 3 is equipped with two bending wires 20, 23 which in each case comprise a first, straight end 221, 223 and a second, round end 201, 231. The straight ends 221, 223 lie in each case against a stop 24 of a guide rail 291 of the actuating unit 3. The guide rail 291 is connected fixedly and non-releasably to the actuating unit 3. The stops 24 ensure that, in the case of a displacement of the actuating unit 3 as a consequence of a vehicle crash, the respective straight ends 221, 223 of the bending wires 20, 23 are moved together with the actuating unit 3. Here, the fastening section 201 of the round end 21 of the first bending wire 20 remains fixed between the two fixing elements 18, 19 on the coupling device and therefore on the coupling element 16, and therefore remains fixed such that it cannot be moved with respect to the transmission device, with the result that the first bending wire 20 is bent in the respective bending section 202 and in the process absorbs impact energy.

In the illustration of FIG. 3, the fastening section 231 of the round end 21 of the second bending wire 23 is likewise clamped in between two fixing elements 25, 26, only the one fixing element 25 being installed fixedly with the coupling element 16, however. The other fixing element 26 is configured as a movable fixing element. It has the form of a pin which protrudes out of a pyrotechnic switch 27. The pyrotechnic switch 27 is mounted on the transmission element 13 and is fastened by means of a fastening screw 28.

In the case of a vehicle crash, there are then two possibilities:

If the movable fixing element 26 is in the position which is shown in the figure, the fastening section 231 of the round end 21 of the second bending wire 23 is clamped in and fixed between the fixing elements 25, 26. This means that the actuating unit 3 which is displaced to the left along the longitudinal axis 7 in the case of a vehicle crash bends the two bending wires 20, 23, a larger part of the impact energy, which larger part is required to bend two bending wires 20, 23, being absorbed.

If, in the other case, a central control electronics system (not shown) decides on the basis of evaluated sensor inputs that less impact energy is to be absorbed, it actuates the pyrotechnic switch 27 which, thereupon, moves the movable fixing element 26 out of engagement with the second bending wire 23 in fractions of a second. In the case of a displacement of the actuating unit 3 with respect to the transmission device, the second bending wire 23 is merely also displaced, without being bent, however. Impact energy is absorbed solely in the first bending wire 20, as a result of which the quantity of absorbed energy is less than in the first case.

Even if, in the exemplary embodiment which is shown, the transmission element 13 and the coupling element 16 are illustrated as two separate components which are screwed to one another by means of the fastening screws 14, 15, it can be advantageous with regard to less complicated assembly for the transmission element 13 and the coupling element 16 to be configured as a single-piece integral component.

With their stops 24 on the guide rail 291 of the actuating unit 3 and their fixing elements 18, 19, 25, 26 and the pyrotechnic switch 27, the bending wires 20, 23 form a switchable energy absorption apparatus 29 which, depending on the requirement of the respective crash situation, can absorb two different part quantities of the impact energy.

In order to avoid the adjustment forces which are to be transmitted for the longitudinal adjustment by way of the longitudinal adjustment drive 8 from the carrying unit 4 via the transmission device to the actuating unit 3 not being transmitted or being transmitted merely partially via the energy absorption apparatus 29 in normal operation, and in order to avoid an impairment due to this of the function of the energy absorption apparatus 29, it is provided that the coupling device comprises a pin-shaped holding element 33, 34 with a head 37, 42 which is fixed in a counterholder 36, 360, at least one element being arranged between the counterholder 36, 360 and the head 37, 42, which element is connected fixedly to the transmission device which is configured as a transmission element 13 or to the actuating unit 3, a second thickness d of all the elements which are arranged between the counterholder 36, 360 and the head 37, 42 being smaller, in the case of a movement of the actuating unit 3 with respect to the transmission device which is configured as a transmission element 13, than a first thickness D of all the elements in the case where the actuating unit 3 and the transmission device are fixed in their position with respect to one another, as is the case in normal operation.

As a consequence of the self-locking spindle drive 11, 12, the transmission element 13 which is connected fixedly to the coupling element 16 can no longer be displaced on the spindle 11 in the direction of the longitudinal axis 7 with the spindle nut 12 in the case of a standstill of the electric motor 9 and the spindle 11. With the aid of the coupling device according to the invention, the actuating unit 3 is connected fixedly to the coupling element 16 of the coupling device and the transmission device by means of the pin-shaped holding element 36, 360 in normal operation, and can therefore not be displaced in the direction of the longitudinal axis 7 either. The coupling device according to the invention is configured, however, in such a way that, although it is sufficiently stable to transmit the moderately strong longitudinal adjustment forces, it is broken apart under the very high axial forces which occur only in the case of a vehicle crash, if a defined force threshold (also called a limit, limit value or breakaway force) is exceeded, with the result that the actuating unit 3 is displaced in the direction of the longitudinal axis 7 relative to the coupling element 16 which is connected to the transmission device, part of the impact energy being absorbed by way of the energy absorption apparatus 29.

In order to realize a coupling device of this type, the coupling element 16 is provided on its end section which faces the vehicle front with an axially oriented slot 32 which is open toward the front and through which a pin-shaped holding element 33, 34 protrudes transversely, which comprises a shank section and a head 37, 42 which is widened with respect to said shank section 330, 340. The holding element can be configured as a rivet 33 or as a screw 34.

FIGS. 1 to 8 show a first exemplary embodiment, the holding element being configured as a rivet. The rivet 33 is connected fixedly to the actuating unit 3 by the rivet 33 protruding through a bore 35 of the guide rail 291 of the actuating unit 3, and being anchored at the outlet of the bore 35 by means of a counterholder 36 which is configured as a thickened end. As in this exemplary embodiment, the counterholder 36 can form a single-piece integral component with the holding element 33 which is configured as a rivet. In this way, the rivet 33 is fixed as a holding element 33 in the counterholder 36, with the result that the rivet cannot move relative to the counterholder 36. The counterholder 36 is therefore arranged between the outer wall 292 of the guide rail 291 and the casing-shaped tubular section of the actuating unit 3. At its other end, the rivet 33 is provided with a head 37 which lies in a prestressed manner against an elevated edge region 44 on the opposite side of the coupling element 16, the head 37 protruding laterally partially beyond the slot 32. Therefore, the coupling element 16 of the coupling device comprises the slot 32 which is delimited by way of an edge region 44, 440, the edge region 44, 440 comprising a local elevated edge region 44. The coupling element 16 and the outer wall 292 of the guide rail 291 are arranged between the head 37 and the counterholder 36, with the result that, in said exemplary embodiment, the elements according to the invention between the head 37 and the counterholder 36 are formed by way of the coupling element 16 and the outer wall of the guide rail. Therefore, the elements between the head 37 and the counterholder 36 have a first thickness D in the region of the elevated edge region 44, and the elements have a second thickness d outside the elevated edge region, the second thickness d being smaller than the first thickness D.

Figure 7:
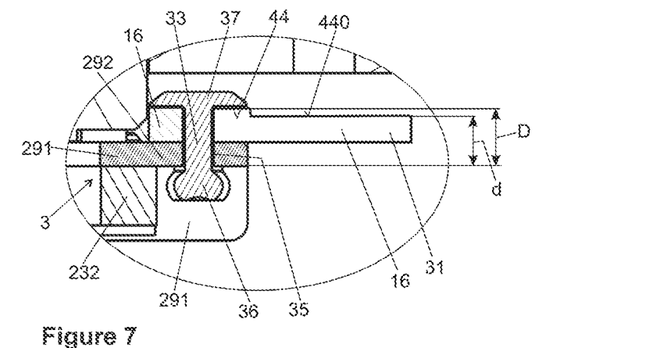
FIG. 7 is an enlarged detail view from FIG. 6 of an example coupling element that is fastened to an actuating unit by way of a rivet, with the head being clamped firmly on the coupling element with prestress, before the breakaway of the rivet.

FIG. 7 shows the position of the rivet 33 in normal operation particularly clearly. The rivet head 37 lies on the elevated edge region 44 of the coupling element 16, with the result that the elements between the head 37 and the counterholder 36 have the first thickness D. The rivet 33 presses the coupling element 16 and the outer wall 292 of the guide rail 291 together, with the result that the elements between the head 37 and the counterholder 36 are subjected to a compressive load and the rivet 33 itself is subjected to a tensile load, as is known to a person skilled in the art from the stressing diagram.

Therefore, the rivet 33 is riveted in such a way that its head 37 lies with prestress against the elevated edge region 44. As a result, sliding down of the rivet 33 which is configured as a holding element from the elevated edge region 44 is prevented, since a frictionally locking connection between the holding element 33, the outer wall 292 and the coupling element 16 which form a clamped connection is produced by way of the prestress. Said clamped connection is stable as long as only the relatively moderate adjustment forces are transmitted between the longitudinal adjustment drive 8 of the carrying unit 4, the transmission device and the actuating unit 3 in normal operation of the vehicle.

Figure 8:
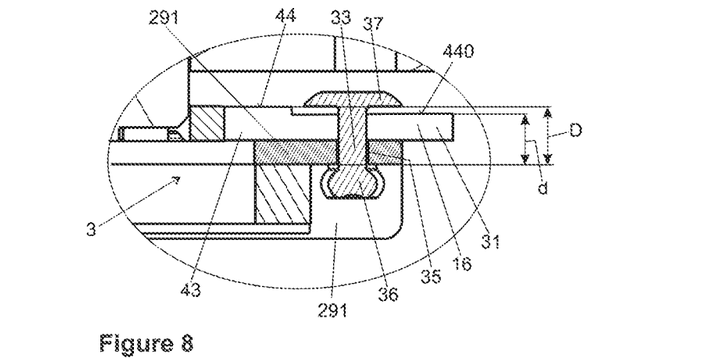
FIG. 8 is the enlarged detail view from FIG. 7 after the breakaway of the rivet in the case of a vehicle crash.

If, in the case of a vehicle crash, extraordinarily high axial forces which exceed a predefined value act on the coupling device, however, the holding element 33 which is configured as a rivet slides from the elevated edge region 44 of the coupling element 16 and moves axially in the direction of the longitudinal axis 7 of the open end of the slot 32 together with the actuating unit 3. The energy absorption apparatus 29 which is arranged between the actuating unit 3 and the transmission device absorbs at least part of the energy which is input via the steering shaft 2.

FIG. 8 shows a position of the rivet 33 during the case of a crash. The head 37 has moved away from the elevated edge region 44 of the coupling element 16, with the result that the elements between the head 37 and the counterholder 36 now have the second thickness d, with the result that the elements between the head 37 and the counterholder 36 are loaded merely with a low force or are free of loading. Therefore, in the case of the movement of the actuating unit 3 with respect to the transmission device in the case of a crash, a targeted prestressing force loss occurs in the elements between the head 37 and the counterholder 36.

In other words, after sliding off from the elevated edge region 44, the prestress and the frictionally locking connection between the holding element 33 which is configured as a rivet and the coupling element 16 are canceled, with the result that the holding element 33 can move substantially freely through the slot 32 and out of its open end.

Figure 9:
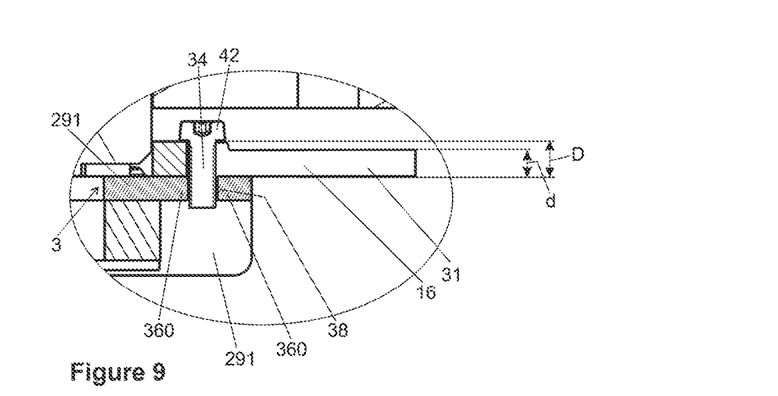
FIG. 9 is an enlarged detail view similar to FIG. 7, but in another example, with a holding element in the form of a screw that is screwed into a threaded bore of an actuating unit.

FIG. 9 shows a second embodiment of the invention. The holding element 34 is configured as a screw 34 with a head 42. In this embodiment, the counterholder 360 is formed by way of the outer wall 292 of the guide rail 291, the outer wall comprising a bore 38. The latter can comprise a thread which is of corresponding configuration with respect to the thread of the screw 34. As an alternative, it can be provided that the screw 34 cuts a thread while being screwed into the bore 38. Screws of this type are called self-tapping screws.

The coupling element 16 of the coupling device comprises the slot 32 which is delimited by way of an edge region 44, 440, the edge region 44, 440 comprising a local elevated edge region 44. The coupling element 16 is arranged between the head 42 and the counterholder 360 which is formed by way of the outer wall 292 of the guide rail 291, with the result that, in this exemplary embodiment, the at least one element according to the invention between the head 42 and the counterholder 360 is formed by way of the coupling element 16. Therefore, the element between the head 42 and the counterholder 360 has a first thickness D in the region of the elevated edge region 44, and the element has a second thickness d outside the elevated edge region 44, the second thickness d being smaller than the first thickness D. FIG. 9 shows the position of the screw 34 in normal operation. The head 42 lies on the elevated edge region 44 of the coupling element 16, with the result that the element, which corresponds to the coupling element 16 in this case, has the first thickness D between the head 42 and the counterholder 360. The screw 34 presses the coupling element 16 together, with the result that the coupling element 16 is subjected to a compressive load between the head 42 and the counterholder 360, and the screw 34 itself is subjected to a tensile load.

If, in the case of a vehicle crash, extraordinarily high axial forces which exceed a predefined value act on the coupling device, the holding element 34 which is configured as a screw slides from the elevated edge region 44 of the coupling element 16 and moves axially in the direction of the open end of the slot 32. The head 42 has moved away from the elevated edge region 44 of the coupling element 16, with the result that the element between the head 37 and the counterholder 360, that is to say the coupling element 16 in this case, then has the second thickness d, with the result that the element between the head 42 and the counterholder 360 is loaded only with a low force or is free of loading. Therefore, in the case of the movement of the actuating unit 3 with respect to the transmission device in the case of a crash, a targeted prestressing force loss occurs in the element between the head 42 and the counterholder 360.

Figure 10:
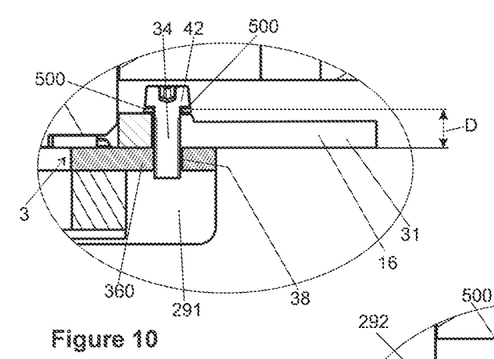
FIG. 10 is an enlarged detail view similar to FIG. 9, but in still another example, with a holding element in the form of a screw that is screwed into a threaded bore of an actuating unit, and with a washer as another element between a head and a counterholder.
Figure 11:
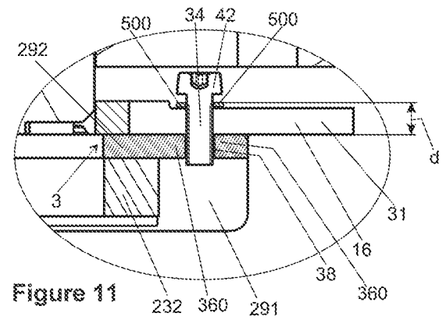
FIG. 11 is an enlarged detail view from FIG. 10 after the breakaway of the holding element in the case of a vehicle crash.

FIGS. 10 and 11 show a third embodiment of the invention which is of similar configuration to the second embodiment. The holding element 34 is configured as a screw 34 with a head 42. In this embodiment, the counterholder 360 is formed by way of the outer wall 292 of the guide rail 291, the outer wall comprising a bore 38 which is coupled to the screw 34.

The coupling element 16 and a washer 500 are arranged between the head 42 and the counterholder 360 which is formed by way of the outer wall 292 of the guide rail 291, with the result that, in this exemplary embodiment, the elements according to the invention between the head 42 and the counterholder 360 are formed by way of the coupling element 16 and the washer 500. Therefore, the elements between the head 42 and the counterholder 360 have a first thickness D in the region of the elevated edge region 44, and the said elements have a second thickness d outside the elevated edge region 44, the second thickness d being smaller than the first thickness D. FIG. 10 shows the position of the screw 34 in normal operation, and FIG. 11 shows the position of the screw 34 and the washer 500 during the case of a crash. The washer 500 can serve to increase the frictional force which is opposed to the movement, and, for this purpose, has a friction-increasing coating and/or an increased roughness. The function of the embodiment which is shown in FIGS. 10 and 11 corresponds to that of the first and second embodiment.

Figure 12:
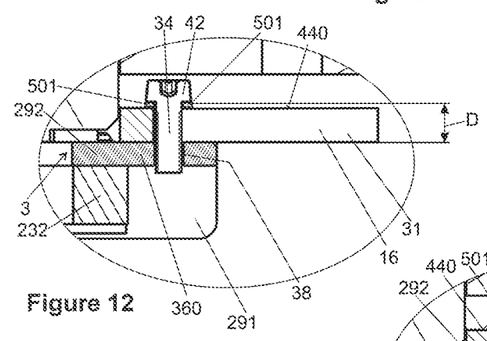
FIG. 12 is an enlarged detail view similar to FIG. 10, but in yet another example, with a holding element in the form of a screw that is screwed into a threaded bore of an actuating unit, and with a breakable washer as another element between a head and a counterholder.
Figure 13:
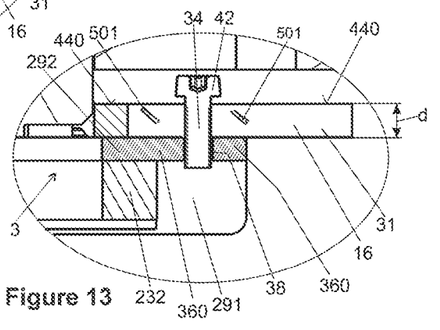
FIG. 13 is an enlarged detail of the example from FIG. 12 after the breakaway of the holding element and the breaking of the washer in the case of a vehicle crash.

FIGS. 12 and 13 show a fourth embodiment of the invention which is of similar configuration to the third embodiment. The holding element 34 is configured as a screw 34 with a head 42. In this embodiment, the counterholder 360 is also formed by way of the outer wall 292 of the guide rail 291, the outer wall 292 comprising a bore 38 which is coupled to the screw 34.

The coupling element 16 and a washer 501 are arranged between the head 42 and the counterholder 360 which is formed by way of the outer wall 292 of the guide rail 291, with the result that, in this exemplary embodiment, the elements according to the invention in normal operation between the head 42 and the counterholder 360 are formed by way of the coupling element 16 and the washer 501. The coupling element 16 of the coupling device is of planar configuration; therefore, in this embodiment, the coupling element 16 does not comprise an elevated edge region, but rather merely comprises the planar edge region 440. Therefore, the elements between the head 42 and the counterholder 360 have a first thickness D in normal operation. In the case of a crash, the washer 501 is destroyed and is moved by way of the movement of the actuating unit 3 with respect to the transmission device out of the region between the head 42 and the counterholder 360, with the result that the element has a second thickness d in the case of a crash, the second thickness d being smaller than the first thickness D. In the case of a crash, the number of elements between the head 42 and the counterholder 360 is therefore reduced. FIG. 12 shows the position of the screw 34 in normal operation, and FIG. 13 shows the position of the screw 34 and the fragments of the washer 501 during the case of a crash. The washer 501 is preferably formed from a brittle material, from an elastomer or a laminated fabric. The function of the embodiment which is shown in FIGS. 13 and 14 corresponds to that of the first, second and third embodiments.

In order to break away the clamped connection, an axial force is required which is greater than the greatest adjustment force which occurs in normal operation. On the other hand, the required breakaway force must not be so great that, in the case of a vehicle crash, the energy absorption apparatus is not activated. The coupling device according to the invention has the advantage that the breakaway force can be set by way of suitable selection of the prestressing force between the respective holding element 33, 34 and the elevated edge region 44 of the coupling element 16 of the coupling device.

The invention has provided a longitudinally adjustable steering column having an energy absorption apparatus, which is of simple construction and in the case of which the breakaway force which is required in the case of a crash for activating the energy absorption apparatus can be set satisfactorily in structural terms.

What is claimed is:

1. An adjustable steering column for a motor vehicle, the adjustable steering column comprising:
    an actuating unit for mounting a steering shaft such that the steering shaft is rotatable about a longitudinal axis;
    a carrying unit in which the actuating unit is mounted such that the actuating unit is displaceable axially in a direction of the longitudinal axis by way of a motorized longitudinal adjustment drive that is disposed on the carrying unit;
    a transmission device coupled on a first side to the actuating unit and on a second side to the longitudinal adjustment drive;
    an energy absorption apparatus that absorbs energy upon displacement of the actuating unit relative to the transmission device; and
    a coupling device connected to the actuating unit and to the transmission device, wherein the coupling device is configured to disconnect from at least one of the actuating unit or the transmission device in a crash event where a force that exceeds a predefined value acts on the steering shaft in the direction of the longitudinal axis, wherein disconnection of the coupling device from the at least one of the actuating unit or the transmission device enables movement between the actuating unit and the transmission device, wherein the coupling device comprises a pin-shaped holding element with a head, wherein the pin-shaped holding element is fixed in a counterholder, wherein an element that is connected fixedly to the transmission device or the actuating unit is disposed between the counterholder and the head, wherein a second thickness of all elements disposed between the counterholder and the head are smaller in a first case of a movement of the actuating unit relative to the transmission device than a first thickness of all the elements in a second case where the actuating unit is positionally fixed relative to the transmission device.

2. The adjustable steering column of claim 1 wherein the second thickness is smaller than 0.9 times the first thickness.

3. The adjustable steering column of claim 1 wherein the pin-shaped holding element is configured as a rivet, a bolt, or a screw.

4. The adjustable steering column of claim 3 wherein the actuating unit comprises a bore for fastening the rivet or a threaded bore for screwing in the screw.

5. The adjustable steering column of claim 4 wherein a desired prestressing force is generated by way of a tightening torque of the screw.

6. The adjustable steering column of claim 1 wherein in a crash event the coupling device is configured to disconnect from the actuating unit, wherein the energy absorption apparatus comprises a first bending wire, wherein a first end of the first bending wire is connected to the actuating unit, wherein a second end of the first bending wire is connected to the coupling device.

7. The adjustable steering column of claim 6 wherein the energy absorption apparatus comprises a second bending wire, wherein the first end of the second bending wire is connected to the actuating unit and the second end of the second bending wire is connected to the coupling device via a switching connection that is releasable via a pyrotechnic switch.

8. The adjustable steering column of claim 1 wherein the longitudinal adjustment drive comprises a spindle drive with a spindle nut that is displaceable axially on a spindle, wherein a transmission element that is connected to the spindle nut is configured as the transmission device, wherein the transmission element and the coupling device are configured as a single-piece integral component.

9. The adjustable steering column of claim 1 wherein a washer is disposed between the head and the counterholder.

* * * * *